United States Patent
Yoshikawa et al.

(10) Patent No.: US 7,954,529 B2
(45) Date of Patent: Jun. 7, 2011

(54) HEAVY DUTY TIRE

(75) Inventors: Hideaki Yoshikawa, Kobe (JP); Kiyoto Maruoka, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 900 days.

(21) Appl. No.: 11/905,271

(22) Filed: Sep. 28, 2007

(65) Prior Publication Data
US 2008/0178982 A1 Jul. 31, 2008

(30) Foreign Application Priority Data

Nov. 20, 2006 (JP) .................. 2006-313261

(51) Int. Cl.
*B60C 15/00* (2006.01)
*B60C 15/06* (2006.01)
(52) U.S. Cl. ........ 152/539; 152/540; 152/541; 152/542; 152/546; 152/547
(58) Field of Classification Search .................. 152/539, 152/540, 541, 542, 543, 544, 545, 546, 547, 152/555
See application file for complete search history.

(56) References Cited

U.S. PATENT DOCUMENTS 6,354,351 B1 * 3/2002 Miyazono ..................... 152/543
2006/0207710 A1 * 9/2006 Yoshikawa et al. ........... 152/547

FOREIGN PATENT DOCUMENTS

JP 2005-178618 A 7/2005

* cited by examiner

*Primary Examiner* — Justin Fischer
(74) *Attorney, Agent, or Firm* — Birch, Stewart, Kolasch & Birch, LLP

(57) ABSTRACT

A heavy duty tire comprises: a carcass ply of cords extending between bead portions; and a bead reinforcing layer disposed in each of the bead portion. The carcass ply has edges winded around the bead cores so that the winded portion has a base part extending along the bead core from the axially inside to the axially outside thereof, and a radially outer part extending axially inwards on the radially outside of the bead core. The bead reinforcing layer comprises: a curved portion extending along the base part; an axially outer portion extending radially outwardly, separation from the base part; and an axially inner portion extending radially outwardly along a main portion of the carcass ply. The bead reinforcing layer is composed of a ply of cords laid side by side, and the spacing Da of the cords in an axially outer part beneath the bead core, of the curved portion is not less than 1.5 times and not more than 3.0 times the spacing Db of the cords in the axially outer portion.

4 Claims, 6 Drawing Sheets

HEAVY DUTY TIRE

BACKGROUND OF THE INVENTION

The present invention relates to a pneumatic tire, more particularly to a bead structure suitable for heavy duty tires.

In Japanese Patent Application Publication No. 2005-178618, a heavy duty tire is disclosed, wherein the edges (ce) of a carcass ply (c) are each winded almost once around a bead core (b) as shown in FIG. 5 in contrast to a conventional structure as shown in FIG. 6 wherein the edges of a carcass ply are each turned up around a bead core so as to extend radially outwards.

In the case that the carcass ply edge is winded around the bead core, when the carcass ply main portion (cm) is pulled radially outwards due to the tire inflation, axially outward deflections of the sidewall portion and the like, the bead core (b) is subjected to rotational deformations around its central axis. As a result, the contact pressure between the bead bottom (bb) and the bead seat (bs) of the wheel rim on which the tire is mounted is increased locally in a heel-side region (y) than a toe-side region of the bead bottom surface. Therefore, the bead bottom surface is hardened unevenly due to the locally increased pressure and heat during long time use. More specifically, the hardness of the bead bottom surface becomes high on the heel side than the toe side and as a result cracks are liable to occur. If such local hardening and/or cracks are occurred in the bead portions, the tire can not be reused by retreading.

SUMMARY OF THE INVENTION

It is therefore, an object of the present invention to provide a heavy duty tire, in which the occurrence of local hardening and cracks can be effectively prevented to improve the bead durability, and thus reuse of the tire by retreading is possible in order to contribute to resource saving and energy saving.

According to the present invention, a heavy duty tire comprises: a tread portion; a pair of sidewall portions; a pair of bead portions each with a bead core therein; a carcass ply of cords extending between the bead portions through the tread portion and sidewall portions, the carcass ply having a pair of edges each winded around the bead core in one of the bead portions so that the winded portion has a curved base part which extends along the bead core from the axially inside to the axially outside thereof, and a radially outer part which extends axially inwards on the radially outside of the bead core; and a bead reinforcing layer disposed in each bead portion, the bead reinforcing layer comprising a curved portion extending along the curved base part of the carcass ply, an axially outer portion extending radially outwardly from the axially outer end of the curved portion, separation from the base part, and an axially inner portion extending radially outwardly from the axially inner end of the curved portion along a main portion of the carcass ply, wherein the bead reinforcing layer is composed of a ply of cords laid side by side, and the spacing Da of the cords in an axially outer (or heel-side) part of the curved portion beneath the bead core is not less than 1.5 times and not more than 3.0 times the spacing Db of the cords in the axially outer portion.

Preferably, the bead core has a cross sectional shape being generally long in the tire axial direction and having an aspect ratio in a range of 0.43 to 0.58.

In this invention, unless otherwise noted, dimensions of the tire refer to those under a 50 kPa state in which the tire is mounted on a standard wheel rim and loaded with no tire load, and the tire presser is decreased to 50 kPa. The standard wheel rim is a wheel rim officially approved for the tire by standard organization, i.e. JATMA (Japan and Asia), T&RA (North America), ETRTO (Europe), STRO (Scandinavia) and the like.

DESCRIPTION OF THE PREFERRED EMBODIMENT(S)

Figure 1:
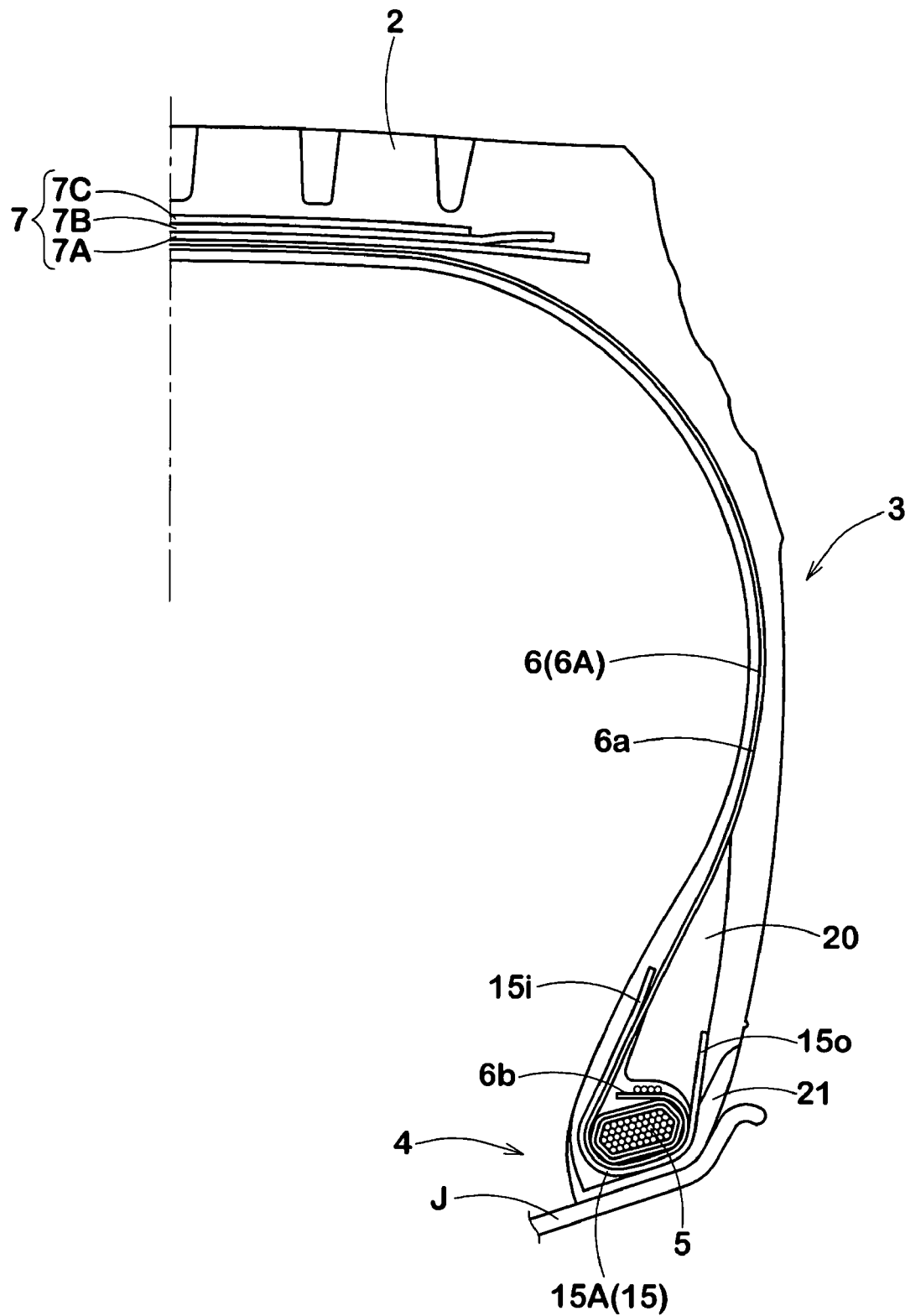
FIG. 1 is a cross sectional view of a heavy duty tire according to the present invention under the 50 kPa state.

An embodiment of the present invention will now be described in detail in conjunction with accompanying drawings.

In the drawings, heavy duty tire 1 according to the present invention comprises a tread portion 2, a pair of sidewall portions 3, a pair of axially spaced bead portions 4 each with a bead core 5 therein, a carcass 6 extending between the bead portions 4, a belt 7 disposed radially outside the carcass 6 in the tread portion 2, and a bead reinforcing layer 15 disposed in each of the bead portions 4.

The tire 1 is a tubeless radial tire to be mounted on a 15-degree-taper center-drop rim J whose bead seats J1 are tapered axially inwards at 15 degrees. Accordingly, the bottom of the bead portion 4 is also inclined at almost 15 degrees, more accurately 15 degrees or slightly larger (for example, up to about 10 degrees larger).

The carcass 6 is composed of a single ply 6A of steel cords arranged radially at an angle of 80 to 90 degrees with respect to the circumferential direction. The carcass ply 6A extends between the bead portions 4 through the tread portion 2 and sidewall portions 3, and in each of the bead portions 4, the edge is winded almost once around the bead core 5 from the axially inside to the outside, thereby forming a pair of winded portions 6b and a main portion 6a therebetween.

The belt 7 comprises at least two cross breaker plies 7A and 7B of parallel steel cords. In this embodiment, the belt 7 is made up of three plies: a radially innermost first ply 7A of steel cords laid at an angle of 10 to 35 degrees with respect to the tire equator; a radially outer second ply 7B of steel cords laid at an angle of 10 to 35 degrees with respect to the tire equator, crosswise to the cords of the first ply 7A; and a radially outermost third ply 7C of steel cords laid at an angle of 10 to 35 degrees with respect to the tire equator crosswise to the cords of the second ply 7B.

The bead core 5 is a ring formed by winding a steel wire 5w a predetermined number of turns into a specific cross sectional shape having a radially inner side SL. The radially inner side SL becomes substantially parallel to the bead seat J1 of the rim J when the tire is mounted thereon. Therefore, with respect to the bottom of the bead portion 4, the radially inner side SL is parallel or slightly inclined radially outwardly towards the axially inside (for example up to about 10 degrees).

The cross sectional shape is generally long in the tire axial direction, and the aspect ratio HC/WC of the bead core 5 is in a range of from 0.43 to 0.58, wherein "WC" is the maximum width between the extreme ends in a direction parallel with the radially inner side SL measured in this parallel direction, and "HC" is the maximum thickness between the extreme ends in the direction perpendicular to the radially inner side SL measured in this perpendicular direction.

Various shapes may be employed as the cross sectional shape, but polygons, e.g. hexagons, rectangles and the like are preferred. In this example, therefore, a flattened hexagonal shape is employed, which has: the above-mentioned radially inner side SL; a radially outer side SU being parallel with the radially inner side SL; two axially outer sides So in a V-shaped formation; and two axially inner sides Si in a V-shaped formation.

In order to prevent loosening of the windings of the bead wire 5w, the bead core 5 can be wrapped by a wrapping layer 8, e.g. rubberized canvas, rubber seat or the like.

Figure 3:
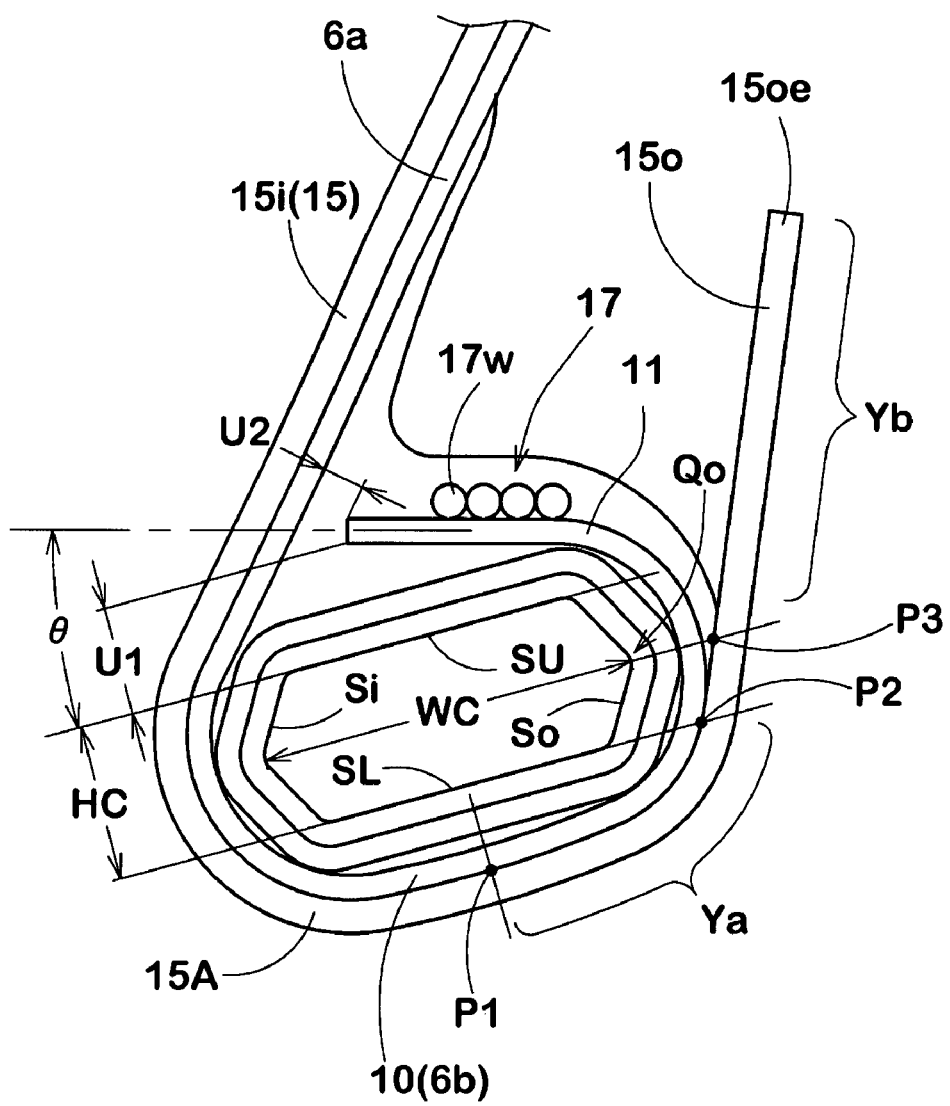
FIG. 3 is a schematic cross sectional view for explaining the heel-side beneath-core part and radially-extending part of the bead reinforcing layer.

As shown in FIG. 3, the above-mentioned winded portion 6b of the carcass ply is smoothly curved around the bead core 5 to have a base part 10 and a radially outer part 11. The base part 10 is defined as extending along the axially inner sides Si, radially inner side SL and axially outer sides So of the bead core 5. The radially outer part 11 is defined as extending from the axially outer end of the base part 10 towards the carcass ply main portion 6a, while leaving a space between the radially outer side of the wrapping layer 8 (or the radially outer side SU of the bead core 5 in the case that the wrapping layer 8 is not provided).

In order to secure the winded portion 6b to the bead core 5 firmly, the inclination angle theta of the radially outer part 11 is set in a range of not more than 60 degrees, preferably not more than 45 degrees with respect to the direction parallel to the radially inner side SL. However, in order to reduce springback of the carcass cords, the inclination angle theta is preferably set in a range of not less than 10 degrees, more preferably not less than 15 degrees with respect to the direction parallel to the radially inner side SL. And the distance U1 of the end 11a of the radially outer part 11 from the radially outer side SU is preferably set in a range of from 3 to 12 mm. Further, the distance U2 of the end 11a from the carcass ply main portion 6a is preferably set in a range of from 1 to 5 mm. If the distance U1 is less than 3 mm, the springback of the radially outer part 11 increases, and it becomes difficult to build a raw tire. If the distance U1 is more than 12 mm, stress is liable to concentrate on the end 11a of the radially outer part 11, which is disadvantageous in view of the bead durability. If the distance U2 is less than 1 mm, the ends 11a of the carcass cords becomes liable to contact with and thus damage the carcass cords of the main portion 6a. If the distance U2 is more than 5 mm, the carcass ply can not be fully secured to the bead core 5.

In this example, further, in order to prevent the springback and thereby to secure the radially outer part 11 in place, a stabilizing cord layer 17 is disposed on the radially outside of the radially outer part 11. The stabilizing cord layer 17 is formed by circumferentially spirally winding a steel cord 17w more than 1 turn, preferably 2 to 6 turns. Preferably the breaking strength of the steel cord 17w is in a range of from 2000 to 4000 N.

Further, the bead portion 4 is provided with a bead apex 20 composed of a radially inner part 20L and a radially outer part 20U. The radially outer part 20U is made of a softer rubber having a JIS type-A durometer hardness Hs3 of from 50 to 60 and a triangular cross sectional shape. The radially inner part 20L is made of a hard rubber having a JIS type-A durometer hardness Hs2 of from 76 to 88 and a L-shaped cross sectional shape. The radially inner part 20L is composed of: a base layer 20La having an almost constant thickness and extending along the radially outside of the radially outer part 11 of the winded portion 6b; and a thin radially extending layer 20Lb extending radially outwardly from the axially inner end of the base layer 20La along the carcass ply main portion 6a. Between the radially outer part 11 and bead core 5, there is disposed a filler 22 made of a rubber having a triangular cross sectional shape and the same hardness as the radially inner part 20L. The filler 22 unites with the radially inner part 20L through the gap (U2) between the end 11a of the radially outer part 11 and the carcass ply main portion 6a. Thus, the end 11a is enwrapped or secured in the relatively hard rubber. Such structure of the bead apex 20 can effectively improve the resistance to the axially outward bending deformation of the bead portion and sidewall lower portion, without increasing the volume of the hard rubber where the energy loss is relatively large. As a result, the rolling resistance and bead durability can be improved at the same time.

Furthermore, the bead portion 4 is provided with the bead reinforcing layer 15 as mentioned above.

Figure 2:
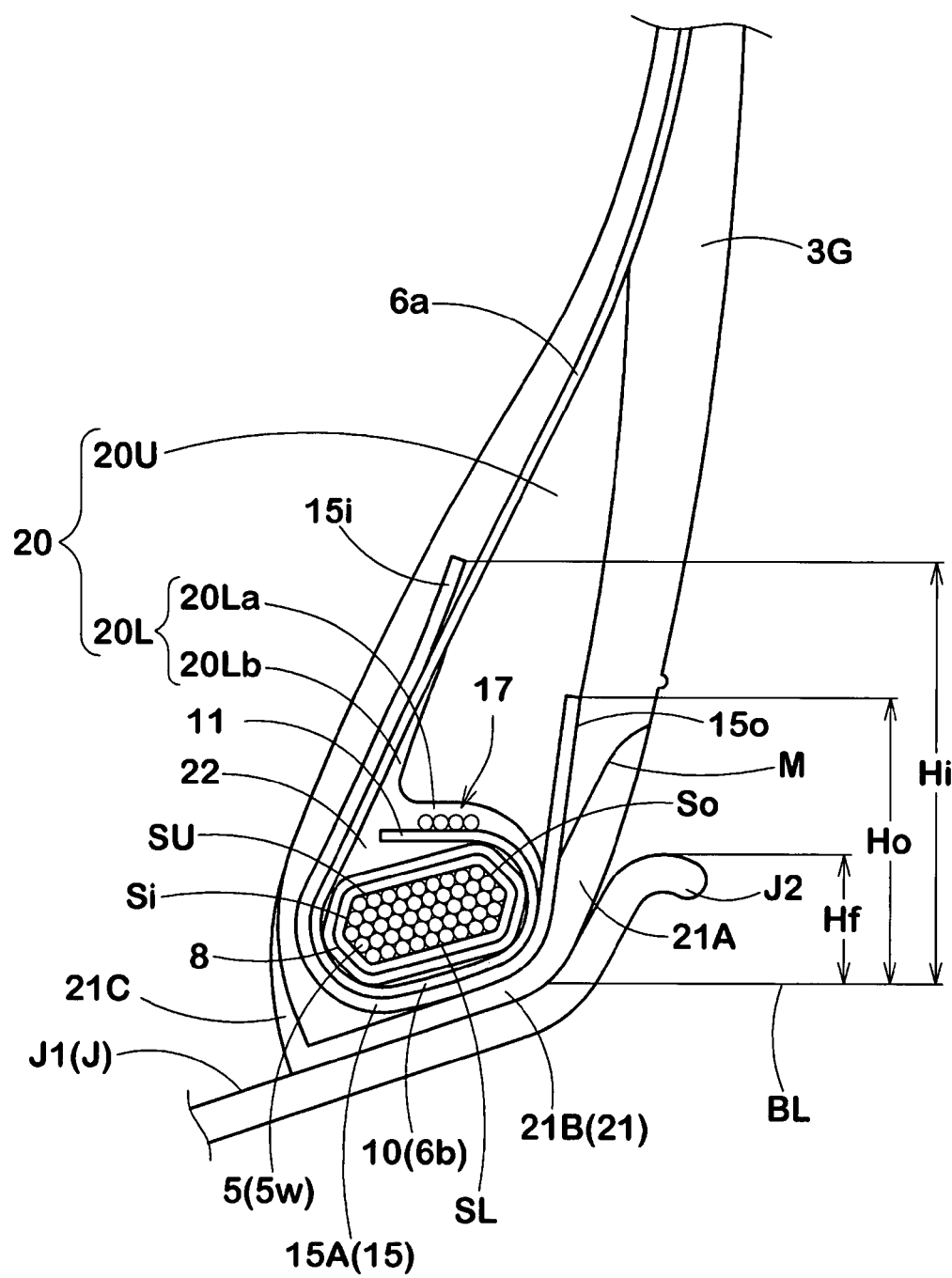
FIG. 2 is an enlarged cross sectional view showing the bead portion and sidewall lower portion thereof.

The bead reinforcing layer 15 is composed of a single ply of steel cords 15w arranged at a variable angle alpha in a range of from 10 to 80 degrees with respect to the tire circumferential direction. The bead reinforcing layer 15 is composed of an axially inner portion 15i, an axially outer portion 15o and a curved base portion 15A therebetween to have a U-shaped cross sectional shape as shown in FIG. 2.

The curved base portion 15A extends along the base part 10 of the winded portion 6b. The axially inner portion 15i extends radially outwardly from the axially inner end of the curved base portion 15A along the axially inner surface of the carcass ply main portion 6a. The axially outer portion 15o extends radially outwardly from the axially outer end of the curved base portion 15A, separating from the base part 10. The axially outer portion 15o extends along the axially outer surface of the bead apex 20, slightly inclining axially outwards.

The purpose of the bead reinforcing layer 15 is to improve the steering stability by the increased rigidity of the bead portion and to improve the bead durability by the decreased bead deflection. Therefore, the radial heights Hi and Ho of the inner portion 15i and outer portion 15o, respectively, are set in a range of not less than 1.5 times, preferably not less than 2.0 times the height Hf of the rim flange J2, both measured from the bead base line BL.

Incidentally, the bead base line BL is as well known in the tire art a straight line drawn in parallel with the tire rotational axis, passing through the bead heel points. More specifically, the bead base line passes through a radial position corresponding to the rim diameter of the standard wheel rim.

If the radial height of the outer portion 15o is however too high, a compressive stress becomes liable to concentrate on the radially outer end of the outer portion 15o.

Therefore, it is preferable that the radial height Ho is not more than 40 mm, preferably not more than 35 mm.

On the other hand, as the end of the inner portion 15i is not subjected to a compressive stress, the radial height Hi can be more than the radial height Ho. For example, the radial height Hi is set in a range of not more than 60 mm, preferably not more than 50 mm.

The bead portion 4 is provided with a chafer 21 made of abrasion-resistant hard rubber having a JIS type-A durometer hardness Hs of from 70 to 90.

The chafer 21 extends along the axially outer surface, the bottom surface and the axially inner surface of bead portion 4. Thus, the chafer 21 has: a base part 21B extending between the bead toe and bead heel, defining the bead bottom surface; an axially inner part 21C extending radially outwardly from the bead toe, defining the axially inner surface of the bead portion; and an axially outer part 21A extending radially outwardly from the bead heel beyond the radially outer end of the rim flange 32, defining the axially outer surface of the bead portion.

The axially outer part 21A is spliced with a relatively soft sidewall rubber 3G. The sidewall rubber 3G is disposed axially outside the carcass 6 in each of the sidewall portions 3. In this example, the interface or boundary M between the sidewall rubber 3G and the axially outer part 21A extends from the axially outer surface of the outer portion 15o of the bead reinforcing layer 15 to the outer surface of the tire while inclining radially outwardly.

According to the present invention, the above-mentioned bead reinforcing layer 15 is locally changed in the cord spacing so as to control cracks of the chafer rubber 21 occurring in a heel-side part beneath the bead core 5, while maintaining the reinforce effect.

As shown in FIG. 3, a heel-side beneath-core part Ya is defined as a part of the bead reinforcing layer 15 between a first point P1 and a second point P2.

Further, a radially-extending part Yb is defined as a part of the bead reinforcing layer 15 between the end 15oe of the outer portion 15o and a third point P3.

The first point P1 is an intersection of the bead reinforcing layer 15 and a straight line passing the midpoint of the radially inner side SL perpendicularly thereto. The second point P2 is an intersection of the bead reinforcing layer 15 and an axially outward extension of the radially inner side SL. The third point P3 is an intersection of the bead reinforcing layer 15 and a straight line being parallel with the radially inner side SL and extending axially outwards from the axially outermost end Qo of the bead core 5.

Figure 4:
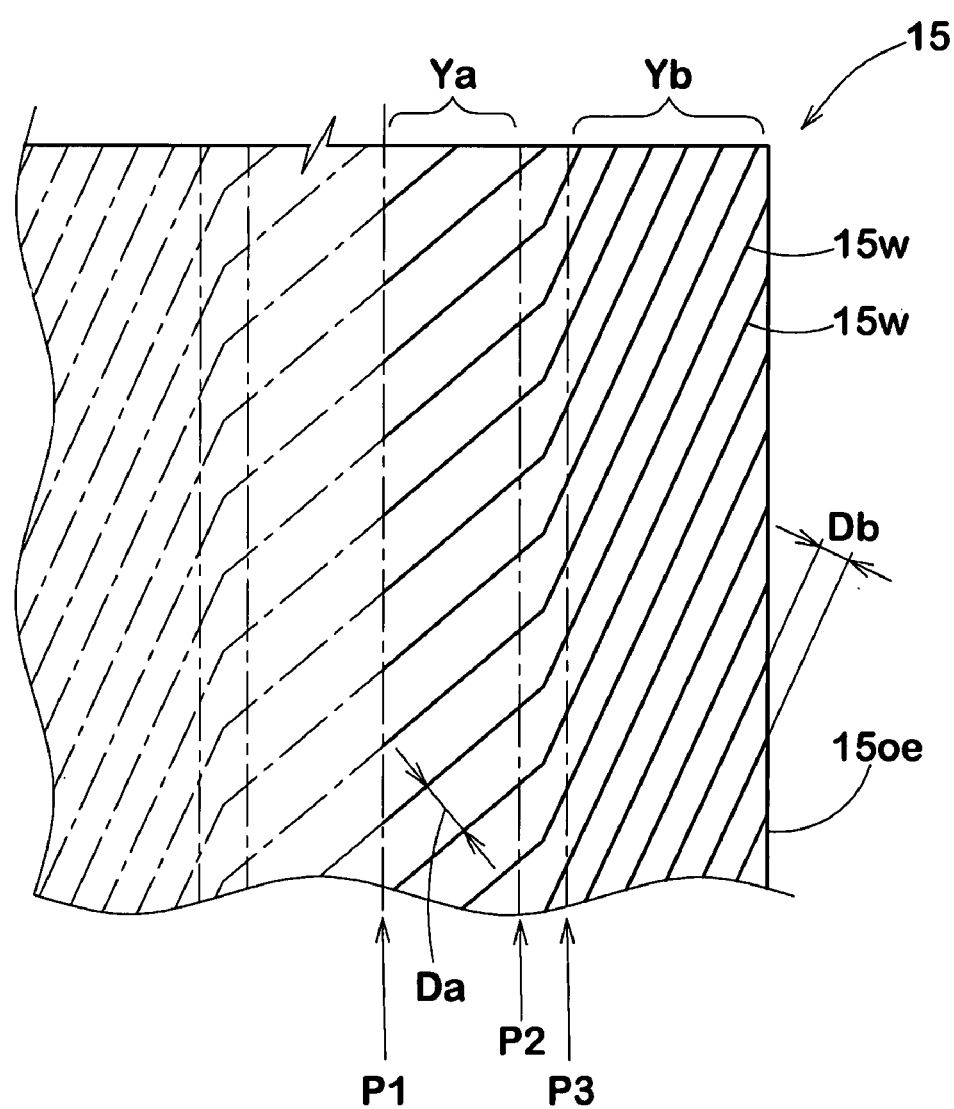
FIG. 4 shows an arrangement of the cords of the bead reinforcing layer in a developed state.
Figure 5:
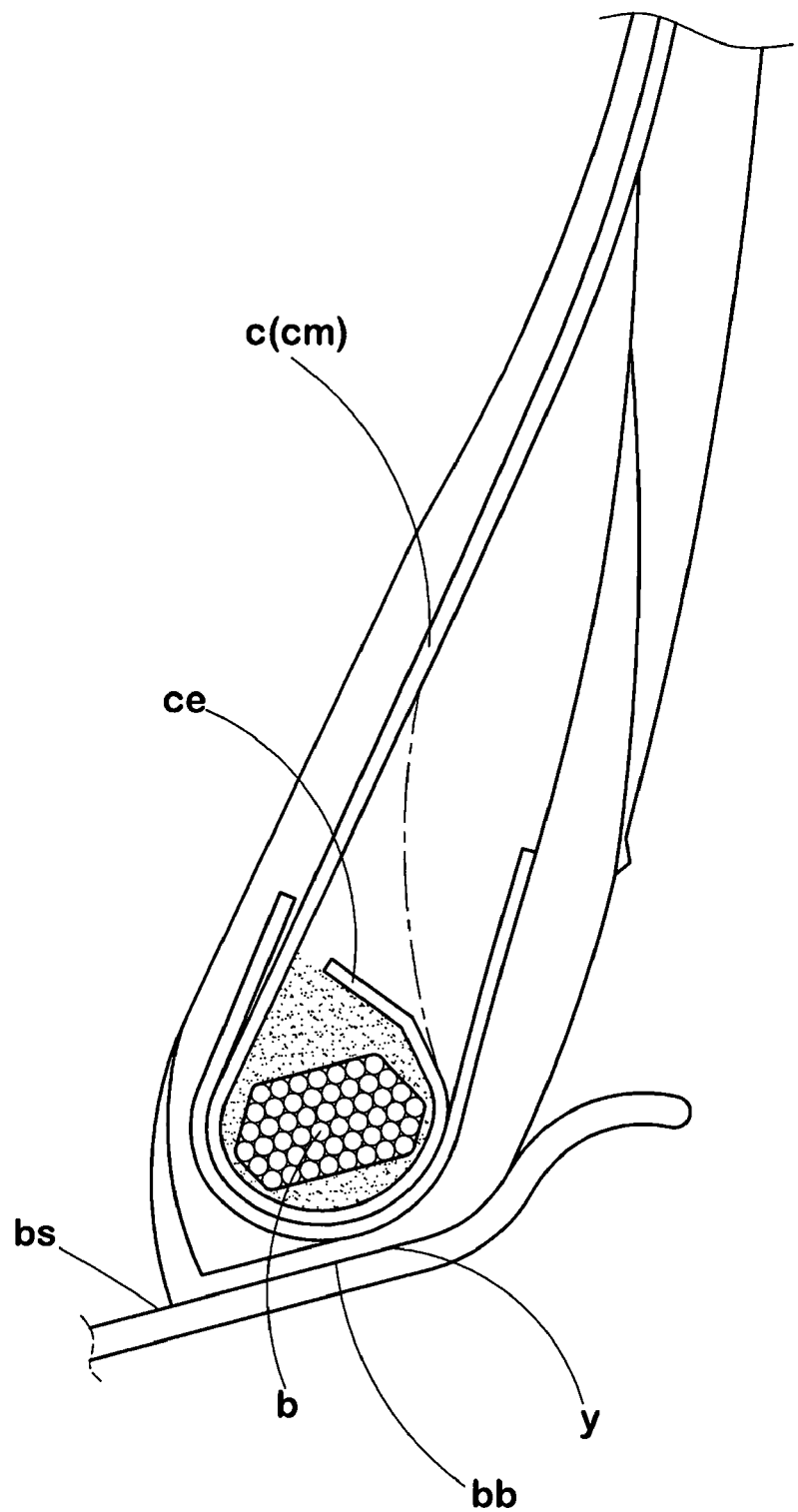
FIG. 5 is a cross sectional view showing a prior art bead structure.

FIG. 4 schematically shows the arrangement of the steel cords 15w of the bead reinforcing layer 15 which is developed in a plane. As illustrated, the cord count in the heel-side beneath-core part Ya is lessened in comparison with the cord count in the radially-extending part Yb.

The spacing Da between the cords 15w of the heel-side beneath-core part Ya is set in a range of not less than 1.5 times, preferably not less than 1.8 times, but not more than 3.0 times, preferably not more than 2.7 times the spacing Db between the cords 15w of the radially-extending part Yb.

Therefore, the rigidity of the bead reinforcing layer 15 is decreased in the heel-side beneath-core part Ya. As a result, the pressure received by the chafer rubber 21 from the bead core and the carcass-cords is mitigated by the heel-side beneath-core part Ya. Accordingly, the local increasing of the contact pressure is controlled to prevent the chafer rubber 21 from hardening and cracking.

In the radially-extending part Yb, however, as the rigidity is relatively high, the steering stability and bead durability can be improved.

If the cord spacing Da is more than 3.0 times the cord spacing Db, it becomes difficult to maintain the cord arrangement in order, and the bead durability may be decreased. Further, the production efficiency may be lowered.

If the cord spacing Da is less than 1.5 times the cord spacing Db, the above-mentioned advantageous effects can not be obtained.

The cord spacing can be changed by changing the above-mentioned angle alpha of the reinforcing cords 15w between the parts Ya and Yb as shown in FIG. 4.

In order that the bead reinforcing layer 15 exerts its reinforcing effect, the cord angle alpha in the radially-extending part Yb is preferably set in a range of from 15 to 60 degrees with respect to the tire circumferential direction, and the cord spacing Db in the radially-extending part Yb is set in a range of from 0.5 to 3.0 mm.

In this example, as the aspect ratio HC/WC of the bead core 5 is lowered as explained above, the contact pressure between the bead bottom and the bead seat J1 becomes even and lower, preventing the local increasing. Therefore, in cooperation with the bead reinforcing layer 15, the hardening and cracks of the chafer rubber 21 in the heel-side part can be effectively controlled. If the aspect ratio HC/WC is less than 0.43, the windings of the bead wire 5w becomes very liable to be disordered, and thereby the bead durability is decreased. If the aspect ratio HC/WC is more than 0.58, the local increasing of the contact pressure can not be prevented. Further, a permanent deformation such that the bead toe is lifted from the bead seat J1 becomes liable to occur.

If such a permanent deformation is caused, then during mounting the tire, high-pressure air, which is injected in the tire to brow up and to place the bead portion on the bead seat, leaks through the gap between the bead toe and bead seat, therefore, it becomes difficult to mount the tire on a rim.

Comparison Tests

Heavy duty radial tires of size 11R22.5 (rim size 7.50×22.5) were made and tested as follows.

The test tires had same structure except for the bead structures. The specifications are shown in Table 1.

Crack Resistance Test:

Using a tire test drum, the test tire mounted on a wheel rim was run at a speed of 100 km/hr under a normal condition (tire load 27.25 kN and tire pressure 700 kPa). After running for 100,000 km, a visual check for cracks of the chafer rubber was made.

Hardening Test:

The complex elastic modulus of the chafer rubber was measured in the heel-side beneath-core part after running for 100,000 km and also when the tire was still new to obtain the ratio $E*1/E*0$ of the modulus $E*1$ after running to the modulus $E*0$ before running. The complex elastic modulus was measured at a temperature 70 deg.C, a frequency 10 Hz, an initial strain 10%, an amplitude +/−2%. The ratio $E*1/E*0$ is indicated in Table 1 by an index based on Ref.1 being 100, wherein the smaller the index number, the lesser the hardening.

Remounting Test:

The tire mounted on a wheel rim and inflated to 700 kPa was put in a hot chamber controlled at 80 deg.C for three days. Then, the tire was demounted and subsequently remounted on the rim by a skilled worker. The remounting operation was evaluated by the workers as to whether the injected air was leaked in high volume or not.

Toe Lifting and Bead Core Deformation Test:

After the tire is remounted and inflated to 700 kPa, by the use of an X-ray CT scanner, the bead portion was checked whether lifting of the bead toe from the bead seat was occured or not, and whether disorder of the windings of the bead wire was occured or not.

Bead Durability Test:

Using the tire test drum, the tire was run under the following accelerated condition: tire load of 3 times 27.25 kN, running speed of 20 km/h, and tire pressure of 700 kPa. The runable time until any damage was occured in the bead portion was measured. The tests were carried out under a cool condition in which the tire and rim assembly was put at ambient temperatures and a hot condition in which the temperature of the rim was kept at 130 degrees C.

The results are indicated by an index based on Ref.1 being 100, wherein the larger the index number, the better the durability.

TABLE 1

| Tire | Ex. 1 | Ex. 2 | Ref. 1 | Ref. 2 | Ref. 3 | Ref. 4 | Ref. 5 | Ex. 3 |
|---|---|---|---|---|---|---|---|---|
| Carcass structure *1 | BW | BW | U | BW | BW | BW | BW | BW |
| Bead reinforcing layer | | | | | | | | |
| Part Ya | | | | | | | | |
| Spacing Da (mm) | 3.0 | 4.0 | 1.5 | 1.5 | 2.0 | 5.0 | 4.0 | 4.0 |
| Angle alpha (deg.) | 40 | 50 | 25 | 25 | 30 | 60 | 50 | 50 |
| Part Yb | | | | | | | | |
| Spacing Db (mm) | 1.5 | 1.5 | 1.5 | 1.5 | 1.5 | 1.5 | 4.0 | 1.5 |
| Angle alpha (deg.) | 25 | 25 | 25 | 25 | 25 | 25 | 50 | 25 |
| Da/Db | 2.0 | 2.67 | 1.0 | 1.0 | 1.33 | 3.33 | 1.0 | 2.67 |
| Bead core | | | | | | | | |
| Aspect ratio HC/WC | 0.45 | 0.45 | 0.6 | 0.45 | 0.45 | 0.45 | 0.45 | 0.6 |
| Structure *2 | A | A | B | A | A | A | A | B |
| Test results | | | | | | | | |
| Crack | none | none | none | occured | none | none | none | none |
| Hardening | 100 | 100 | 100 | 110 | 105 | 100 | 100 | 100 |
| Remounting | good | good | good | good | good | good | good | no good |
| Toe lifting | good | good | good | good | good | good | good | slight |
| Core deformation | none | none | none | none | none | none | none | slight |
| Bead durability | | | | | | | | |
| Cool condition | 130 | 130 | 100 | 130 | 130 | 95 | 95 | 130 |
| Hot cindition | 115 | 115 | 100 | 115 | 115 | 95 | 110 | 110 |

Figure 6:
FIG. 6 is a cross sectional view showing a conventional bead structure.

*1) BW = FIG. 2, U = FIG. 6
*2) A = "9, 10, 11, 10, 9", B = "8, 9, 10, 9, 8, 7" The sequence of numbers indicates the number of the windings(ends) of the wire in each layer in the order from the radially inner side SL to the radially outer side SU.

The invention claimed is:

1. A heavy duty tire comprising:
a tread portion;
a pair of sidewall portions;
a pair of bead portions each with a bead core therein;
a carcass ply of cords extending between the bead portions through the tread portion and sidewall portions, the carcass ply having a pair of edges each winded around the bead core in one of the bead portions so that the winded portion has a curved base part extending along the bead core from the axially inside to the axially outside thereof, and a radially outer part extending axially inwards on the radially outside of the bead core;
a bead reinforcing layer disposed in each said bead portion, the bead reinforcing layer comprising
a curved portion extending along said curved base part of the carcass ply,
an axially outer portion extending radially outwardly from the axially outer end of the curved portion, separating from the base part, and
an axially inner portion extending radially outwardly from the axially inner end of the curved portion along a main portion of the carcass ply, wherein
the bead reinforcing layer is composed of a ply of cords laid side by side, and
the spacing Da of the cords in an axially outer part beneath the bead core, of said curved portion is not less than 1.5 times and not more than 3.0 times the spacing Db of the cords in said axially outer portion;
a bead apex disposed in each said bead portion, the bead apex composed of a radially outer part made of a softer rubber having a triangular cross sectional shape, and a radially inner part made of a hard rubber having a L-shaped cross sectional shape, the radially inner part composed of:
a base layer having an almost constant thickness and extending along the radially outside of the radially outer part of the winded portion; and
a thin radially extending layer extending radially outwardly from the axially inner end of the base layer along the carcass ply main portion; and
a filler disposed between said radially outer part of the winded portion and the bead core in each said bead portion, the filler made of a rubber having a triangular cross sectional shape, wherein
the radially outer part of the bead apex has a JIS type-A durometer hardness Hs3 of from 50 to 60,
the radially inner part of the bead apex has a JIS type-A durometer hardness Hs2 of from 76 to 88, and
the filler has a hardness same as the radially inner part of the bead apex.

2. The heavy duty tire according to claim 1, wherein the bead core has a cross sectional shape being generally long in the tire axial direction and having an aspect ratio in a range of 0.43 to 0.58.

3. The heavy duty tire according to claim 2, wherein each said bead portion is provided with a steel cord winded at least one turn on the radially outside of the radially outer part of the winded portion.

4. The heavy duty tire according to claim 1, wherein a gap is formed between the axially inner end of the radially outer part of the winded portion and the carcass ply main portion, and
the filler unites with the radially inner part of the bead apex through the gap so that the axially inner end is secured in the relatively hard rubber of the radially inner part of the bead apex and the filler.

* * * * *